United States Patent
Wang et al.

(10) Patent No.: US 12,001,510 B2
(45) Date of Patent: Jun. 4, 2024

(54) METHOD AND APPARATUS FOR LENGTH-AWARE LOCAL TILING IN A SPARSE ATTENTION MODULE IN A TRANSFORMER

(71) Applicant: KWAI INC., Palo Alto, CA (US)

(72) Inventors: Zhendong Wang, Plano, TX (US); Yongxiong Ren, San Jose, CA (US); Yang Liu, San Jose, CA (US); Lingzhi Liu, San Jose, CA (US)

(73) Assignee: BEIJING TRANSTREAMS TECHNOLOGY CO. LTD., Beijing (CN)

( * ) Notice: Subject to any disclaimer, the term of this patent is extended or adjusted under 35 U.S.C. 154(b) by 426 days.

(21) Appl. No.: 17/529,208

(22) Filed: Nov. 17, 2021

(65) Prior Publication Data

US 2023/0153381 A1 May 18, 2023

(51) Int. Cl.
  *G06F 18/2134* (2023.01)
  *G06F 18/2431* (2023.01)
  *G06N 3/04* (2023.01)
  *G06T 1/20* (2006.01)
  *G06V 10/82* (2022.01)

(52) U.S. Cl.
  CPC .... *G06F 18/21345* (2023.01); *G06F 18/2431* (2023.01); *G06N 3/04* (2013.01); *G06T 1/20* (2013.01); *G06V 10/82* (2022.01)

(58) Field of Classification Search
  USPC ....................................................... 382/159
  See application file for complete search history.

(56) References Cited

U.S. PATENT DOCUMENTS

| 11,562,734 | B2 | 1/2023 | Ren et al. | |
| 11,830,480 | B2 | 11/2023 | Ren et al. | |
| 2021/0065005 | A1* | 3/2021 | Zhu | G06N 3/082 |
| 2022/0309124 | A1* | 9/2022 | Mei | G06N 3/048 |
| 2022/0310068 | A1 | 9/2022 | Ren et al. | |

OTHER PUBLICATIONS

Ashish Vaswani, et al., "Attention Is All You Need", arXiv: 1706.03762, arXiv: 1706.03762v7 [cs.CL] Aug. 2, 2023 (15p).

(Continued)

*Primary Examiner* — Darryl V Dottin
(74) *Attorney, Agent, or Firm* — Arch & Lake LLP

(57) ABSTRACT

A method and an apparatus for length-aware local tiling in a sparse attention module in a transformer in heterogeneous devices are provided. The method includes that a heterogeneous device including one or more GPUs: divides a transformed sparsity mask into a plurality of first tiles and obtaining one or more effective first tiles from the plurality of first tiles, where each effective first tile includes at least one non-zero element; loads the one or more effective first tiles into a shared memory in the one or more GPUs and loads a plurality of elements in a first matrix corresponding to the one or more effective first tiles into the shared memory; and performs multiplication by a first sampled dense-dense matrix multiplication (SDDMM) kernel in the sparse attention module in the transformer by fetching the one or more effective first tiles and the plurality of elements from the shared memory.

23 Claims, 6 Drawing Sheets

(56) References Cited

OTHER PUBLICATIONS

Iz Beltagy, et al., "Longformer: The Long-Document Transformer", arXiv:2004.05150v2 [cs.CL] Dec. 2, 2020, (17p).
Qipeng Guo, et al., "Star-Transformer", arXiv:1902.09113v3 [cs.CL] Apr. 24, 2022, (11p).
Krzysztof Choromanski, et al., "Rethinking Attention with Performers", arXiv:2009.14794v4 [cs.LG] Nov. 19, 2022, (38p).
Han Shi et al., "SparseBERT: Rethinking the Importance Analysis in Self-attention", arXiv:2102.12871v3 [cs. LG] Jul. 1, 2021, (15p).
NVIDIA cuSPARSE provides SDDMM () and SpMM () implementation API, DU-06709-001_v12.0, Dec. 2022, (310p).
Hong, Changwan, et al. "Adaptive sparse tiling for sparse matrix multiplication." Proceedings of the 24th Symposium on Principles and Practice of Parallel Programming. 2019. (15p).

* cited by examiner

SDDMM 204

SDDMM 204

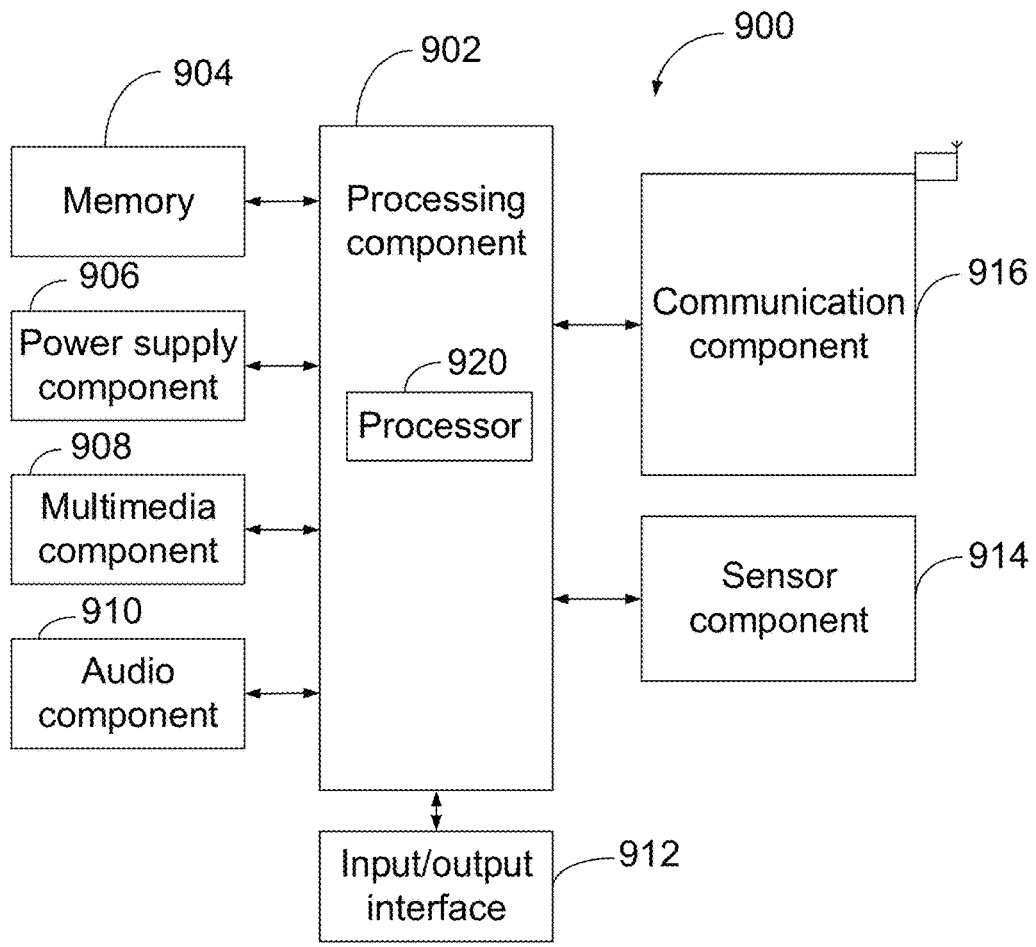

FIG. 9

Divide a transformed sparsity mask into a plurality of first tiles and obtaining one or more effective first tiles from the plurality of first tiles
1002

Load the one or more effective first tiles into a shared memory in one or more GPUs and loading a plurality of elements in a first matrix corresponding to the one or more effective first tiles into the shared memory
1004

Perform multiplication by a first SDDMM kernel in a sparse attention module of the transformer by fetching the one or more effective first tiles and the plurality of elements from the shared memory
1006

FIG. 10

METHOD AND APPARATUS FOR LENGTH-AWARE LOCAL TILING IN A SPARSE ATTENTION MODULE IN A TRANSFORMER

FIELD

The present application generally relates to accelerating a transformer neural network, and in particular but not limited to, accelerating sparse attention calculation in a sparse attention module of the transformer neural network using length-aware tiling in the sparse attention module in the transformer neural network.

BACKGROUND

Transformer neural networks, i.e., transformers, are popular sequence modeling architectures, which have been widely used in many tasks such as machine translation, language modeling, and image generation and objective detection. A transformer neural network can take an input in the form of a sequence of vectors, and converts it into a vector called an encoding, and then decodes it back into another sequence. Transformers can outperform the previously de facto sequence modeling choice, i.e., recurrent neural networks (RNNs), and conventional convolutional neural network (CNN) based models.

RNNs have a fundamentally different design from transformers. An RNN processes the input words one by one and maintains a hidden state vector over time. Every input is passed through several layers of the neural network and modifies the state vector. Theoretically, the state vector, at a given time, could retain information about inputs from far in the past. However, the hidden state of the model usually conserves little usable information about early inputs. New inputs can easily overwrite a state, causing information loss. This means that the performance of an RNN tends to degrade over long sentences. This is called the long-term dependency problem.

By contrast, a transformer processes the entire input sequence at the same time and the attention mechanism allows each output word to draw from each input and hidden state. Because RNNs process the input sequence sequentially, it is hard to take advantage of high-performance computing such as Graphic Processing Units (GPUs). The transformer design, with its parallel processing and multi-head attention mechanisms, allows for much faster training and execution since the different input words can be processed simultaneously on a GPU.

A transformer model is made up of stacked layers, each of which contains a multi-head attention mechanism followed by a small fully-connected network. An attention mechanism used in the transformer model takes in a query matrix Q, a key matrix K, and a value matrix V and computes a weighted average of input values based on the similarity of Q and K, as shown below:

$$\text{Attention}(Q, K, V) = \text{softmax}\left(\frac{QK^T}{\sqrt{d_k}}\right)V$$

While the transformer model is powerful, its main issue is its efficiency bottleneck. Particularly, $QK^T$ computes the similarity of each token in the sequence with all other tokens, requiring computation and memory that grows quadratically with the sequence length n, i.e., $O(n^2)$. This would prevent its use in longer sequence scenarios, such as long-document generation, long audio speech recognition (ASR), and video or image generation. Thus, there is a need of a better transformer architecture with less complexity to efficiently accelerate the transformer model on hardware devices, e.g., GPUs.

SUMMARY

The present disclosure describes examples of techniques relating to accelerating calculation of attention in a sparse attention module in a transformer neural network in CPU/GPU heterogenous devices. Specifically, the present disclosure is related to an in-depth performance optimization on sparse matrix multiplication of a core attention mechanism by leveraging GPU local tiling when the transformer neural network is deployed in CPU/GPU heterogeneous devices.

According to a first aspect of the present disclosure, a method for length-aware local tiling in a sparse attention module in a transformer in heterogeneous devices is provided. The method includes that a heterogeneous device including one or more GPUs divides a transformed sparsity mask into a plurality of first tiles and obtains one or more effective first tiles from the plurality of first tiles, where each effective first tile includes at least one non-zero element.

Furthermore, the heterogeneous device loads the one or more effective first tiles into a shared memory in the one or more GPUs, loads a plurality of elements in a first matrix corresponding to the one or more effective first tiles into the shared memory, and performs multiplication by a first sampled dense-dense matrix multiplication (SDDMM) kernel in the sparse attention module in the transformer by fetching the one or more effective first tiles and the plurality of elements from the shared memory.

According to a second aspect of the present disclosure, an apparatus for length-aware local tiling in a sparse attention module in a transformer in heterogeneous devices is provided. The apparatus includes one or more processors and a memory configured to store instructions executable by the one or more processors.

Further, the one or more processors are configured to divide a transformed sparsity mask into a plurality of first tiles and obtain one or more effective first tiles from the plurality of first tiles, where each effective first tile includes at least one non-zero element.

Moreover, the one or more processors are configured to: load the one or more effective first tiles into a shared memory in the one or more processors and load a plurality of elements in a first matrix corresponding to the one or more effective first tiles into the shared memory; and perform multiplication by a first SDDMM kernel in the sparse attention module in the transformer by fetching the one or more effective first tiles and the plurality of elements from the shared memory.

According to a third aspect of the present disclosure, a non-transitory computer readable storage medium, including instructions stored therein. Upon execution of the instructions by one or more processors, the instructions cause the one or more processors to perform acts including: dividing a transformed sparsity mask into a plurality of first tiles and obtaining one or more effective first tiles from the plurality of first tiles, where each effective first tile includes at least one non-zero element; loading the one or more effective first tiles into a shared memory in the one or more processors and loading a plurality of elements in a first matrix corresponding to the one or more effective first tiles into the shared memory; and performing multiplication by a first SDDMM kernel in a sparse attention module in a transformer in heterogeneous devices by fetching the one or more effective first tiles and the plurality of elements from the shared memory.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 9 is a block diagram illustrating an apparatus for length-aware local tiling in a sparse attention module in a transformer in heterogeneous devices in accordance with an example of the present disclosure.

FIG. 10 is a flowchart illustrating a method for length-aware local tiling in a sparse attention module in a transformer in heterogeneous devices in accordance with an example of the present disclosure.

DETAILED DESCRIPTION

Figure 1:
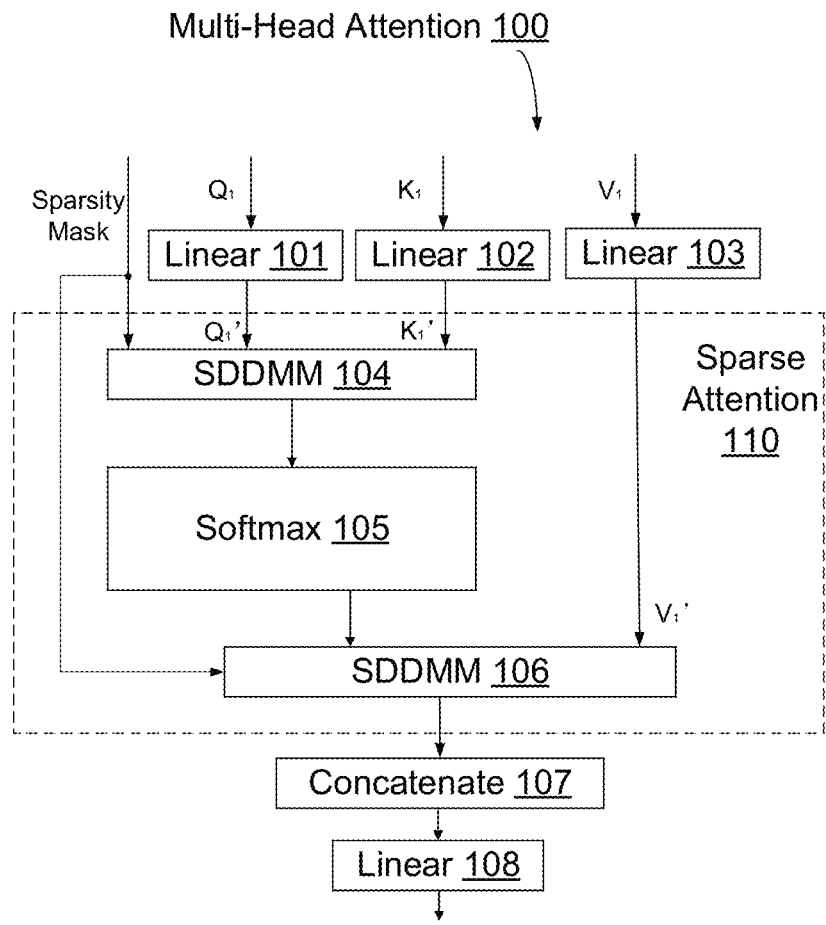
FIG. 1 is a block diagram illustrating a multi-head attention module in a transformer in accordance with an example of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g. devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may include steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The present disclosure provides a general method to optimize and accelerate a sparse transformer model for a CPU/GPU heterogeneous platform. This general method can be easily and widely applied to different sparse transformer models regardless of specific sparsity patterns or masks. Thus, a general sparse attention module in a transformer model is proposed, and the general sparse attention module can be effectively accelerated if being deployed in the CPU/GPU heterogeneous platform. The computation speed of the CPU/GPU heterogeneous platform on which the general sparse attention module is deployed is therefore increased.

CPUs and GPUs are processing units. On a CPU, a kernel is executed repeatedly using different parameters. While a CPU tries to maximize the use of the processor by using two threads per core, a GPU tries to hide memory latency by using more threads per core. For example, the number of active threads per core on AMD hardware is 4 to up to 10, depending on the kernel code. A CPU/GPU heterogeneous platform may have multiple CPUs and multiple GPUs. A transformer may be implemented on a CPU/GPU heterogeneous platform.

For example, a transformer may have an encoder-decoder structure. The encoder of the transformer and the decoder of the transformer may be respectively implemented on different GPUs. Before loading to the encoder, audio, video, or image data may be pre-stored in a sever, a terminal, or storages in clouds. The server or the terminal may include an audio, video, or image collector that collects the audio, video, or image data. The audio, video, or image collector may be a device independent from the server or the terminal and may communicate with the server or the terminal. The terminal may be, but not limited to, a computer, a laptop, a tablet, or a smart phone.

The server or the terminal then processes the audio, video, or image data collected from the audio, video, or image collector. For example, the terminal may extract a plurality of audio, video, or image feature sequences from the audio, video, or image data. Such processing of the audio, video, or image data may be implemented on CPUs for serial multi-thread computation. Each of the plurality of audio, video, or image feature sequences may include a plurality of frames. For example, the number of frames may be 5, 10, 15, or more. After the pre-processing of the audio, video, or image data, following computation may be parallelly performed on one or more GPUs.

The encoder of the transformer may include a plurality of stacked encoder layers that process the input iteratively one layer after another, each of which may include a multi-head attention layer and a position-wise fully connected feed-forward layer. A residual connection may be provided around each of the stacked multi-head attention layer and the position-wise fully connected feed-forward layer, followed by layer normalization/layer norm. Furthermore, before loading an encoder input into the encoder, the encoder input may be first fed into a process of encoder embedding. An output generated by the process of encoder embedding is then sent to an encoder layer.

In some examples, the process of encoder embedding may be implemented by an encoder embedding kernel which adds an input embedding and a positional embedding. The input embedding may be obtained by mapping one audio, video, or image feature sequence into an embedding vector based on a word embedding table. The positional embedding may be obtained based on a position within the audio, video, or image feature sequence.

In some examples, the encoder may include a plurality of encoder layers including encoder layer 1, encoder layer 2, . . . , encoder layer I, where I is a positive integer. An encoder input is fed into the process of encoder embedding first. An output generated by the process of encoder embedding is then sent to the encoder layer 1. An output of the first encoder layer 1 is then sent to the encoder layer 2. As such, each of the following encoder layers i receives an input from the previous encoder layer i−1 and sends respective output to the next encoder layer i+1, where i is an integer between 2 and I−1, including 2 and I−1. At last, the encoder layer I sends its output to a decoder.

Each encoder layer may include a plurality of modules including a multi-head attention module and a feed forward module. These modules may be implemented by processing circuities in a kernel-based machine learning system. For example, the multi-head attention module may be implemented by a multi-head attention mega kernel including a plurality of kernels, such as compute unified device architecture (CUDA) kernels that can be directly run on GPUs.

The multi-head attention module may implement a process of multi-head attention and the feed forward module may implement a process of feed forward. A residual connection together with layer norm are employed between each of the processes. Multi-head attention allows to jointly attend to information from different representation subspaces at different positions.

A decoder may include a plurality of stacked decoder layers. For example, the plurality of stacked decoder layers may include decoder layer 1, decoder layer 2, . . . , decoder layer J, where J may be a positive integer. A decoder input is fed into a process of decoder embedding first. A decoder embedding output generated by the process of decoder embedding is then sent to the decoder. Each decoder layer may include a plurality of modules including a multi-head attention module. The multi-head attention module in each decoder layer may be a multi-head self-attention module or a multi-head cross-attention module. These modules may be implemented by processing circuities in a kernel-based machine learning system. For example, the multi-head self-attention module may be implemented by a multi-head self-attention mega kernel including a plurality of kernels, such as CUDA kernels that can be directly run on GPUs. Further, the multi-head cross-attention module may be implemented by a multi-head cross-attention mega kernel including a plurality of kernels, such as CUDA kernels that can be directly run on GPUs. CUDA kernels enable parallel computing of multiple threads directly on GPUs, thus speeding up computing by harnessing the power of GPUs for the parallelizable part of the computation.

Further, according to some examples of the present disclosure, a sparse attention module in the transformer may include two SDDMM kernels which implement attention calculation. One SDDMM kernel may load a query matrix Q, a key matrix K, and a sparsity mask which may be transformed, and then generate a first output matrix. A softmax kernel in the transformer may then load the first output matrix and generate a second output matrix which is in a regular dense matrix format. The other SDDMM kernel may load the second output matrix and a value matrix V and generate an attention output for the spare attention module. The query matrix Q, the key matrix K, and the value matrix V may be stored in a regular dense matrix format. The sparsity mask and the first output matrix may be stored in a compressed format, such as a compressed row storage (CRS) format, so as to save storage. As a result, the entire sparse attention module is well wrapped and can be easily applied to different sparsity transformer model regardless of the specific sparsity patterns.

FIG. 1 is a block diagram illustrating a multi-head attention module in a transformer in accordance with an example of the present disclosure. As illustrated in FIG. 1, the multi-head attention module 100 may be implemented through linear projections, SDDMMs, softmax, and concatenation. The multi-head attention module may be the multi-head self-attention module in an encoder layer i or a decoder layer j, or the multi-head cross-attention module in a decoder layer j. In some examples, a layer norm layer will be provided following each linear layer.

Sparsity indicates the number of zero elements divided by the total number of elements in a matrix. Sparsity can be used in an attention mechanism or module of a transformer model to accelerate attention calculation. For example, starTransformer, LogSparse, and Longformer employ sparsity in transformer attention mechanism to address this issue. Sparse transformer attention mechanism allows each token to attend to only a subset of fixed positions in outputs of $QK^T$, using the equation below:

$$Q \times K^T \times M$$

where M indicates a sparsity mask, Q and K are respectively intermediate representations of an encoder input, an encoder output, or a decoder input. Thus, sparse transformer attention can be controlled by an attention mask $M=[0, 1]^{n \times n}$, where $M_{i,j}=1$ indicates that token i can attend to token j, and 0 otherwise. Theoretically, computation and memory complexity of the sparse transformer can be reduced to $O(n \log(n))$, $O(n\sqrt{n})$, or even to $O(n)$. Even so, previous works mainly explore different sparsity patterns, i.e., the sparsity position during $QK^T$, in the sparse attention mechanism from the perspective of algorithm and dedicate little efforts to the hardware implementation and optimization. In fact, less algorithmic complexity does not necessarily mean faster inference if deployed in hardware devices including GPUs. This is particularly true for sparse attention-based transformer models since utilization of attention sparsity in computation generally requires dedicated hardware architecture design, limiting its wide adaption in real deployments. Therefore, it would be desirable to develop an acceleration methodology of sparse attention-based transformer on regular hardware devices such that the attention sparsity pattern can be taken full advantage of to provide a practical solution for the quadratic complexity problems of conventional transformers.

As illustrated in FIG. 1, a sparsity mask is used in the multi-head attention module 100. The multi-head attention module 100 may include a sparse attention module 110 which may include two SDDMM kernels including a first SDDMM kernel 104 and a second SDDMM kernel 106, and a softmax kernel 105. Inputs of the multi-head attention module 100 may include a sparsity mask, a first matrix $Q_1$, a second matrix $K_1$, and a third matrix $V_1$. The first matrix $Q_1$, the second matrix $K_1$, and the third matrix $V_1$ may be respectively intermediate representations of an encoder input of a current encoder layer or a decoder input of a current decoder layer. In the multi-head cross-attention module of a decoder layer, the first matrix $Q_1$ and the second matrix $K_1$ are related to the encoder output generated by the encoder. In some examples, the transformer encompassing the multi-head attention module 100 shown in FIG. 1 may be implemented in hardware devices including GPUs, Application Specific Integrated Circuits (ASICs) including AI ASICs, Field Programmable Gate Arrays (FPGAs), etc.

Each kernel processes input data of the kernel when deployed on hardware devices, such as the GPUs. For example, as shown in FIG. 1, the first SDDMM kernel 104 processes all inputs loaded to the first SDDMM kernel 104 including the sparsity mask, the first matrix $Q_1$, and the second matrix $K_1$, when deployed on the GPU.

The first SDDMM kernel 104 and the second SDDMM kernel 106 respectively process all inputs loaded to each SDDMM kernel 104, 106 when deployed on the GPU.

In some examples, a linear projection, i.e., a fully connected layer in a neural network, projects a first vector of a first dimension $d_1$ to a second vector of a second dimension $d_2$ by multiplying a projection matrix $[d_1, d_2]$. For example, as shown in FIG. 1, the first matrix $Q_1$ is projected by a linear projection kernel 101 to a first linearly projected matrix of dimension $d_k$. The second matrix $K_1$ is projected by a linear projection kernel 102 to a second linearly projected matrix $K_1'$ of dimension $d_k$. The third matrix $V_1$ is projected by a linear projection kernel 103 to a third linearly projected matrix $V_1'$ of dimension $d_v$.

In some examples, the first matrix $Q_1$ may include a set of queries patched together into a matrix, the second matrix $K_1$ may include a set of keys patched together into a matrix, and the third matrix $V_1$ may include a set of values patched together into a matrix. The sets of queries, keys, and values may be related to encoder layers or decoder layers. Rows of the first matrix $Q_1$, the second matrix $K_1$, and the third matrix $V_1$ may be respectively queries, keys, and values.

In some examples, the first matrix $Q_1$ and the second matrix $K_1$ are respectively linearly projected through the linear projection kernel 101 and the linear projection kernel 102, and the first linearly projected matrix and the second linearly projected matrix $K_1'$ are respectively obtained. After linear projection, the first and second linearly projected matrices and $K_1'$ are loaded into the first SDDMM kernel 104. In addition to and $K_1'$, the sparsity matrix is loaded into the first SDDMM kernel 104, as shown in FIG. 1.

In some examples, the first and second linearly projected matrices $Q_1'$ and $K_1'$ loaded into the first SDDMM kernel 104 are respectively stored in the regular dense matrix format which keeps all the matrix elements including zeros and non-zeros, while the sparsity matrix that is loaded into the first SDDMM kernel 104 is stored in a compressed format.

The first SDDMM kernel 104 may generate a first output based on the first and second linearly projected matrices $Q_1'$ and $K_1'$, and the sparsity mask. A softmax kernel 105 in the sparse attention module 110 may scale and apply a softmax function over the first output and generate a second output. The second SDDMM kernel 106 may load the second output, the third linearly projected matrix $V_1'$, and the sparsity matrix, and then generate an attention output for the sparse attention module 110.

Figure 2:
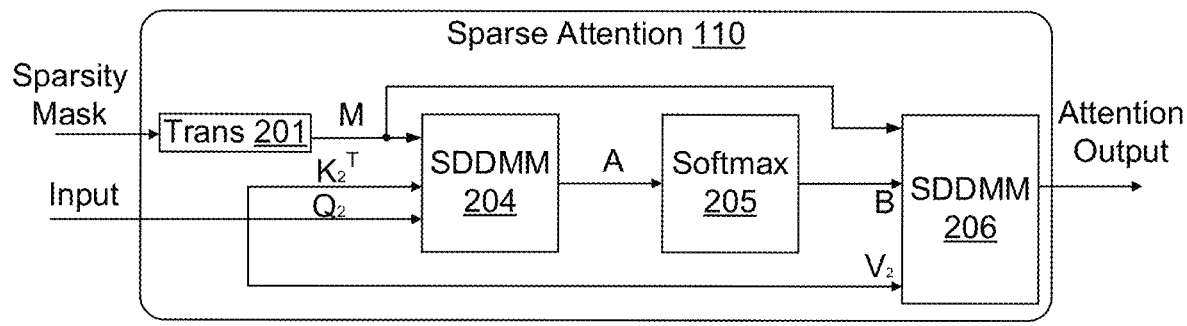
FIG. 2 is a block diagram illustrating a sparse attention module in a multi-head attention module in accordance with an example of the present disclosure.

In some examples, as illustrated in FIG. 2, a sparsity mask in the regular dense matrix format is transformed through a transformation kernel 201 to a transformed sparsity mask M and the transformed sparsity mask M is loaded into a first SDDMM kernel 204. FIG. 2 illustrates another example of the sparse attention module 110. The first SDDMM kernel 204 may be the same as the first SDDMM kernel 104. A first matrix $Q_2$ and a transpose of a second matrix $K_2$ are loaded into the first SDDMM kernel 204. The first matrix $Q_2$ and the second matrix $K_2$ may be the same as the first and second linearly projected matrices $Q_1'$ and $K_1'$ loaded into the first SDDMM kernel 104, as shown in FIG. 1.

In some examples, the first SDDMM kernel 204 may perform an operation as follows:

$$A=(Q_2 K_2^T) o M$$

where $Q_2$ represents the first matrix $Q_2$ that is stored in the regular dense matrix format, $K_2^T$ represents a transpose of the second matrix $K_2$ that is stored in the regular dense matrix format, M represents the transformed sparsity mask that is stored in the compressed format, A represents a first output of the first SDDMM kernel 204, and o denotes component-wise multiplication.

Furthermore, the first output A of the first SDDMM kernel 204 is a sparse matrix that is stored in the compressed format. In some examples, the compressed format that the transformed sparsity mask M and the first output A are stored in is a CRS format. The CRS format puts subsequent non-zeros of matrix rows in contiguous memory locations.

The CRS format may create three vectors: entry, col, and row for a sparse matrix. For example, the sparse matrix may include n rows and n columns. The sparse matrix does not have to be include same number of rows and columns. The entry vector stores the values of the nonzero elements of a matrix. The col vector stores the column indices of the nonzero elements in the entry vector and entries are grouped by row. The row vector stores the locations in the col and the entry vectors of the first entry associated with each row, and the last entry of the row vector indicates where the first entry of row n+1 may go. The associated CRS format may store these vectors using three separate files, containing the entry, column, and row information separately, thus significantly saves storage.

For example, a sparse matrix K is defined as follows:

$$K = \begin{matrix} 10 & 0 & 0 & 0 & -2 \\ 3 & 9 & 0 & 0 & 0 \\ 0 & 7 & 8 & 7 & 0 \\ 3 & 0 & 8 & 7 & 5 \\ 0 & 8 & 0 & 9 & 13 \end{matrix}$$

The CRS format for this sparse matrix K is then specified by arrays {entry, col, row} as below:

| entry | 10 | -2 | 3 | 9 | 7 | 8 | 7 | 3 | 8 | 7 | 5 | 8 | 9 | 13 |
|---|---|---|---|---|---|---|---|---|---|---|---|---|---|---|
| col | 0 | 4 | 0 | 1 | 1 | 2 | 3 | 0 | 2 | 3 | 4 | 1 | 3 | 4 |
| row | 0 | 2 | 4 | 7 | 11 | 14 | | | | | | | | |

As illustrated in FIG. 2, the first output A is directly loaded into the softmax kernel 205. The softmax kernel 205 may scale the first output A and apply a softmax function over the first output A, which is a sparse matrix, to generate a second output B. The second output B is in a regular dense matrix format. For example, the softmax kernel 205 may apply the softmax function over the first output A as follows:

$$B = \mathrm{softmax}(A/\sqrt{d_k})$$

where $d_k$ indicates dimension of a query matrix or a key matrix, such as the first linearly projected matrix $Q_1'$, the second linearly projected matrix $K_1'$, as shown in FIG. 1.

The second output B is then loaded to another matrix multiplication kernel in the sparse attention module 110. The matrix multiplication kernel may load the second output B, the third matrix $V_2$ and the transformed sparsity mask M, as illustrated in FIG. 2. In some examples, the third matrix $V_2$ may be linearly projected through a linear projection kernel 103 and generate a linearly projected third matrix $V_1'$. The linearly projected third matrix $V_1'$ may be stored in the regular dense matrix format. The matrix multiplication kernel may perform a matrix multiplication over the second output B, the linearly projected third matrix $V_1'$, and the transformed sparsity mask M.

In some examples, the matrix multiplication kernel may be a SDDMM kernel as illustrated in FIGS. 1-2. As illustrated in FIG. 2, a second SDDMM kernel 206 loads the second output B, the third matrix $V_2$ and the transformed sparsity mask, and applies an SDDMM as:

$$C = (BV_2) o M$$

where the second output B is a matrix stored in the regular dense matrix format, and o denotes component-wise multiplication. The output C generated by the second SDDMM kernel 206 is an attention output of the sparse attention module 110.

Moreover, the output C is loaded to a concatenate kernel 107 and after the concatenate kernel 107 jointly concatenates attention outputs, a linear projection kernel 108 receives concatenated attention outputs and generates an output for the multi-head attention module 100, as shown in FIG. 1. In some examples, a layer norm may follow the linear projection kernel 108 and generate the output for the multi-head attention module 100. In some examples, a layer norm may follow each linear projection kernel 101, 102, or 103. A layer norm may normalize each feature of activations of a previous layer, such as the linear projection kernel 101, 102, 103, or 108, to zero mean and unit variance.

Figure 3:
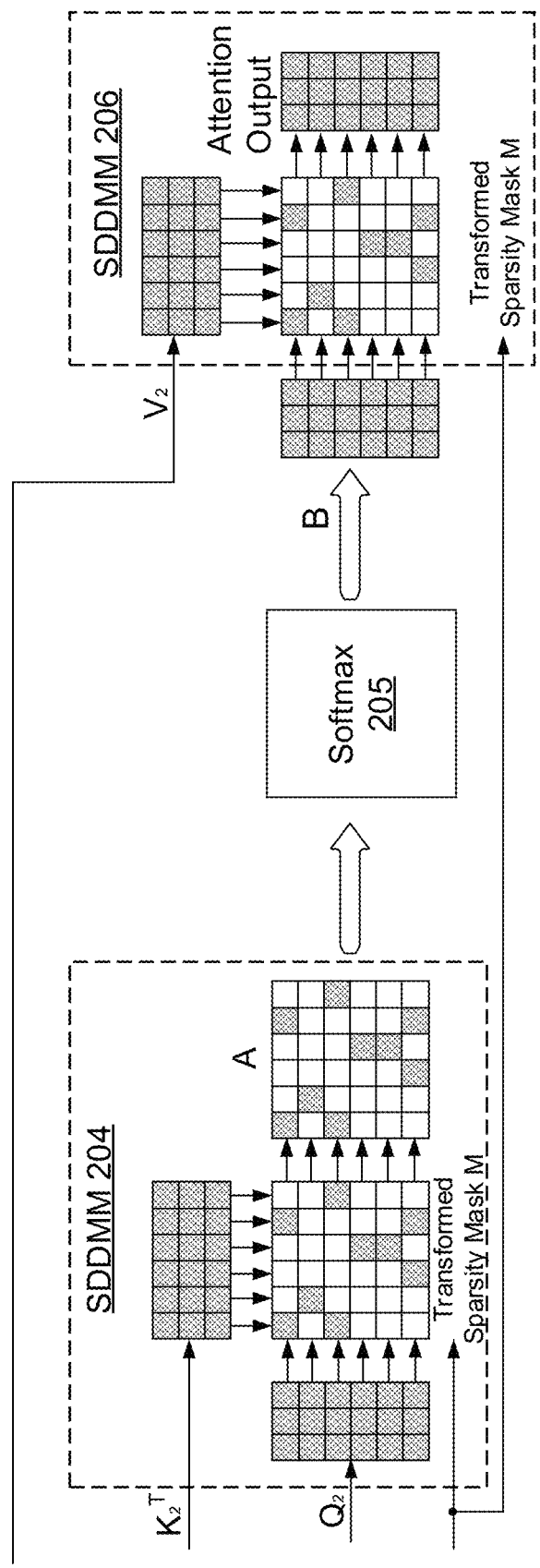
FIG. 3 is a block diagram illustrating sparse matrix multiplication implemented on two SDDMM kernels according to FIG. 2.

FIG. 3 is a block diagram illustrating sparse matrix multiplication implemented on two SDDMM kernels according to FIG. 2. As shown in FIG. 3, the first SDDMM kernel 204 may implement matrix multiplication of the first matrix $Q_2$ stored in the regular dense matrix format, the transpose of the second matrix $K_2$ stored in the regular dense matrix format, and the transformed sparsity mask M stored in the compressed format, such as the CRS format.

As shown in FIG. 3, in the transformed sparsity mask M, elements marked with crossing lines are non-zero elements. For example, element $m_{i,j}$ represents a matrix element at row i+1 and column j+1 of the transformed sparsity mask M, that is, the matrix element at the i+1$^{th}$ row and the j+1$^{th}$ column. As illustrated in FIG. 3, elements $m_{0,0}$, $m_{0,4}$, $m_{1,1}$, $m_{2,0}$, $M_{2,5}$, $m_{3,3}$, $m_{4,3}$, $m_{5,2}$, $m_{5,4}$ are respectively non-zero elements. The first SDDMM kernel 204 performs the operation $A = Q_2 \times K_2^T \times M$ and generated the first output matrix A.

The softmax kernel 205 receives the first output matrix A from the first SDDMM kernel 204 and generates the second output B. As shown in FIG. 3, the second output B may be a matrix stored in the regular dense matrix format. The second SDDMM kernel 206 receives the second output B, the third matrix $V_2$ and the transformed sparsity mask M, performs multiplication $C = B \times V_2 \times M$, and generates the output C as the attention output of the sparse attention module 110.

In-Depth Performance Optimization on the Sparse Matrix Multiplication

In some examples, an in-depth performance optimization on the sparse matrix multiplication of the core attention mechanism by leveraging GPU local tiling, e.g., shared memory, when the model is deployed in CPU/GPU heterogeneous platform is provided. To efficiently implement the sparse matrix multiplication, e.g., SDDMM, on a GPU, following steps may be performed. Firstly, the sparse matrix is partitioned into a set of rows which are further subdivided into a set of 2D tiles. The size of a 2D tile may be T×T, where T may be a positive integer and may be the number of rows and/or columns of the 2D tile. Elements within the 2D tile may be presented in the CSR format. Secondly, space for the 2D tiles are pre-allocated and the 2D tiles are loaded into shared memory. Thirdly, during multiplication execution, the dense matrix is loaded into the shared memory based on the 2D tile size and partial accumulation results of each row of the 2D tile may be kept in registers to improve the reuse of dense matrix elements and output results. Moreover, for an empty 2D tile, its corresponding multiplication is skipped. The empty 2D tile may contain no elements and there is no need to preload these tiles. The three steps above are wrapped into a complete sparse attention module such that it can be easily ported to different sparse transformer models.

Figure 4:
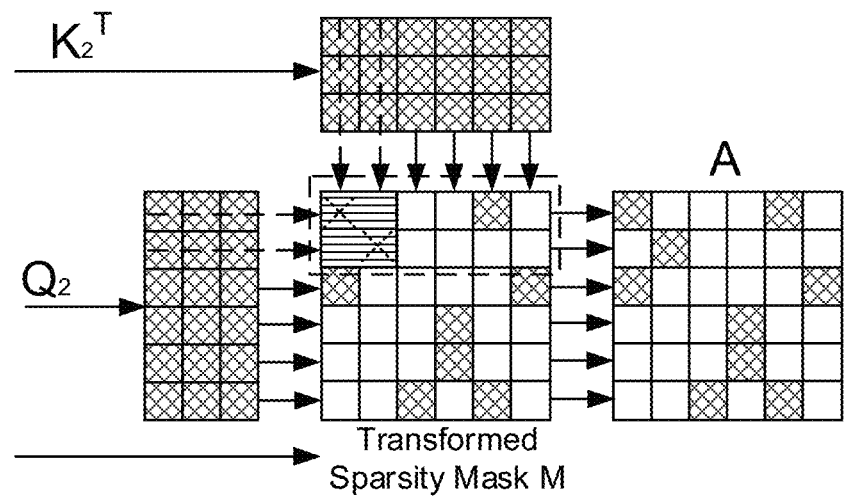
FIG. 4 illustrates a sparse matrix multiplication based on 2D tiling implemented on an SDDMM kernel in accordance with an example of the present disclosure.

FIG. 4 illustrates a sparse matrix multiplication based on 2D tiling implemented on an SDDMM kernel in accordance with an example of the present disclosure. As illustrated in FIG. 4, the first SDDMM kernel 204 implements SDDMM of the first matrix $Q_2$, the transpose of the second matrix $K_2^T$, and the transformed sparsity mask M. The transformed sparsity mask M is stored in a compressed format, such as the CRS format. The first matrix $Q_2$ and the second matrix $K_2$ are stored in the regular dense matrix format while the transformed sparsity mask M is stored in the compressed format, such as the CRS format.

As shown in FIG. 4, the transformed sparsity mask M is partitioned or subdivided into multiple 2D tiles, each of which has a size of 2×2. The multiple 2D tiles may include one or more effective 2D tiles and one or more empty 2D tiles. Each of the one or more effective 2D tiles may contain at least one nonzero element. All elements in each empty 2D tile may be zero. The one or more effective 2D tiles are loaded into shared memory of one or more GPUs. When loading each effective 2D tile, rows of a dense matrix, e.g., the first matrix $Q_2$, corresponding to the effective 2D tile and columns of the other dense matrix, e.g., the transpose of the second matrix $K_2^T$, corresponding to the effective 2D tiles are loaded into the shared memory and partial results of the first output matrix A are calculated. As shown in FIG. 4, the first two rows of the first matrix $Q_2$ are corresponding to two rows of the first effective 2D tile of the transformed sparsity mask M as marked in FIG. 4. Elements in the first two rows of the first matrix $Q_2$ are loaded into the shared memory.

Similarly, the first two columns of the transpose of the second matrix $K_2$ are corresponding to two columns of the first effective 2D tile of the transformed sparsity mask M. Elements in the first two columns of the transpose of the second matrix $K_2$ are loaded into the shared memory.

During the calculation process, as each thread fetches data from the shared memory, these data can be reused to speed up the calculation process. Meanwhile, the temporary result of the first output matrix A is stored in registers indicating that each thread can directly write the data to the registers. As a result, the temporary result can be quickly accessed and be reused as well. Furthermore, when loading different 2D tiles into the shared memory, corresponding elements of $Q_2$ and $K_2^T$ are streamed in and out for calculation. Moreover, as empty 2D tiles are not loaded into shared memory at all, the multiplication of corresponding elements of $Q_2$ and $K_2^T$ are not performed at all, which can save computation cost. Overall, by leveraging 2D tiling techniques, the computation of SDDMM can be speeded up.

As illustrated in FIG. 4, the first SDDMM kernel 204 implements SDDMM of the first matrix $Q_2$, the transpose of the second matrix $K_2$, and the transformed sparsity mask M. The transformed sparsity mask M is stored in a compressed format, such as the CRS format. The first matrix $Q_2$ and the second matrix $K_2$ are stored in the regular dense matrix format while the transformed sparsity mask M is stored in the compressed format, such as the CRS format.

Figure 5:
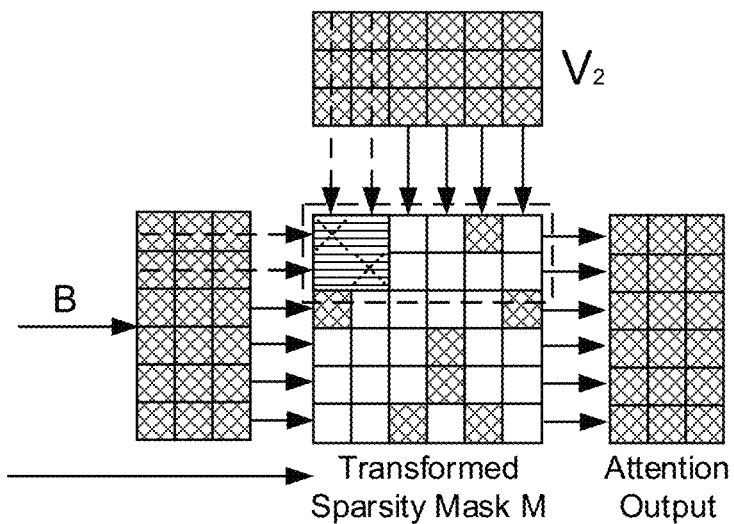
FIG. 5 illustrates a sparse matrix multiplication based on 2D tiling implemented on another SDDMM kernel in accordance with an example of the present disclosure.

As illustrated in FIG. 5, the second SDDMM kernel 206 implements SDDMM of the third matrix $V_2$, the second output B that is generated by the softmax kernel, and the transformed sparsity mask M. The transformed sparsity mask M is stored in a compressed format, such as the CRS format. The third matrix $V_2$ and the second output B are stored in the regular dense matrix format.

As shown in FIG. 5, the transformed sparsity mask M is partitioned or subdivided into multiple 2D tiles, each of which has a size of 2×2. The multiple 2D tiles may include one or more effective 2D tiles and one or more empty 2D tiles. Each of the one or more effective 2D tiles may contain at least one nonzero element. All elements in each empty 2D tile may be zero. The one or more effective 2D tiles are loaded into the shared memory of one or more GPUs. Similar to the operation implemented on the first SDDMM kernel 204 as shown in FIG. 4, when loading each effective 2D tile, elements of the third matrix $V_2$ and the second output B corresponding to the effective 2D tiles are loaded into the shared memory for calculation. And the results may be temporarily stored in registers as well.

As shown in FIG. 5, the first two columns of the third matrix $V_2$ are corresponding to columns of the first effective 2D tile of the transformed sparsity mask M as marked in FIG. 5. Elements in the first two columns of the third matrix $V_2$ are loaded into the shared memory. Furthermore, the first two rows of the second output B are corresponding to rows of the first effective 2D tile of the transformed sparsity mask M as marked. Elements in the first two rows of the second output B are loaded into the shared memory.

In some examples, the implementation and optimization of the sparse matrix multiplication based on 2D local tiling is input-length-aware and application-dependent, especially for the SDDMM kernel 204 or 206. Specifically, the input length can vary for the transformer. To effectively perform the 2D local tiling optimization, different strategies may be provided based on different input lengths.

In some examples, the input length is small. For example, the input length is smaller than a first length. The first length may be 64, 128, etc. When the input length is small, both dense matrices can be partitioned into 2D tiles and simultaneously loaded into shared memory. In these examples, both Q and $K^T$ tiles resident in shared memory can be well reused. Due to the much higher speed of shared memory compared to cache, the benefit of 2D tiling optimization can be thoroughly exploited to speed up the computation.

Figure 6:
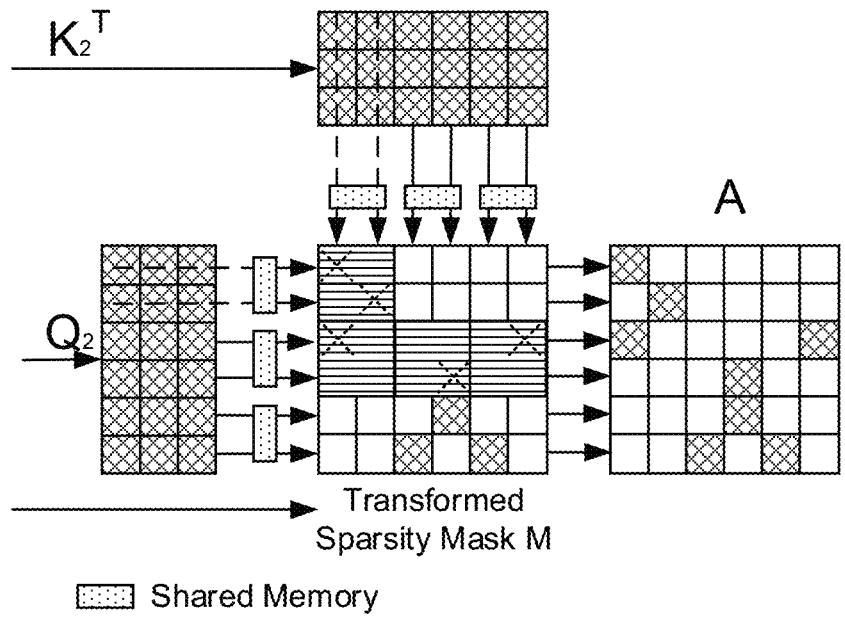
FIG. 6 illustrates an implementation of another SDDMM kernel in accordance with an example of the present disclosure.

FIG. 6 illustrates an implementation of an SDDMM kernel in accordance with an example of the present disclosure. FIG. 6 utilizes the first SDDMM kernel 204 as an example, but not limited to the first SDDMM kernel 204. The 2D local tiling optimization illustrated in FIG. 6 may be implemented by other SDDMM kernels including the first and second SDDMM kernels 204 and 206. As shown in FIG. 6, for illustration purpose, the effective 2D tiles located in the first row to the fourth row of the transformed sparsity mask are marked with horizontal straight lines and non-zero element with cross "X". Effective 2D tiles further include two effective tiles that are in the fifth and sixth rows and the third to sixth columns of the transformed sparsity mask M.

FIG. 6 illustrates when the input length is small, both the first matrix $Q_2$ and the transpose of the second matrix $K_2$ are loaded into the shared memory according to the effective 2D tiles of the transformed sparsity mask M. As shown in FIG. 6, the first two rows of the first matrix $Q_2$ are respectively corresponding to rows of a first effective 2D tile of the transformed sparsity mask M. The first effective 2D tile, as illustrated in FIG. 6, is the left top tile which includes two non-zero elements as marked with cross "X". The first two rows of the first matrix $Q_2$ are loaded into the shared memory.

Similarly, the third and fourth rows of the first matrix $Q_2$ correspond to the three effective 2D tiles in the middle of the transformed sparsity mask M. The fifth and sixth rows of the first matrix $Q_2$ correspond to rows of the last two effective 2D tiles of the transformed sparsity mask M. The third to sixth rows of the first matrix $Q_2$ are loaded into the shared memory.

Further, columns of the transpose of the second matrix $K_2$ corresponding to the effective 2D tiles of the transformed sparsity mask M are also stored into the shared memory.

In some examples, the input length is medium. For example, the input length is between the first length and a second length. The second length may be 512, 1024, 2048, 4096, etc. Similarly, because the shared memory has much higher speed but limited capacity, e.g., capacity per share memory is smaller than 96 KB in T4 GPU, the tile size must be set small, and all tiles must be loaded from global memory to shared memory multiple times, which may offset the benefit of 2D local tiling. In comparison, the L2 cache capacity is much larger. For example, capacity of the L2 cache is 6M in T4 GPU. Thus, when loading the two dense matrices, e.g., Q and $K^T$, only one dense matrix, e.g., Q, is partitioned into 2D tiles and the 2D tiles obtained are loaded into shared memory while the other dense matrix, e.g., $K^T$, is loaded into the L2 cache. As a result, elements of $K^T$ resident in L2 cache can be reused by all blocks. Also, the Q tiles resident in shared memory can be reused within each block and the tile size can be set large while limited by the capacity of the shared memory.

Figure 7:
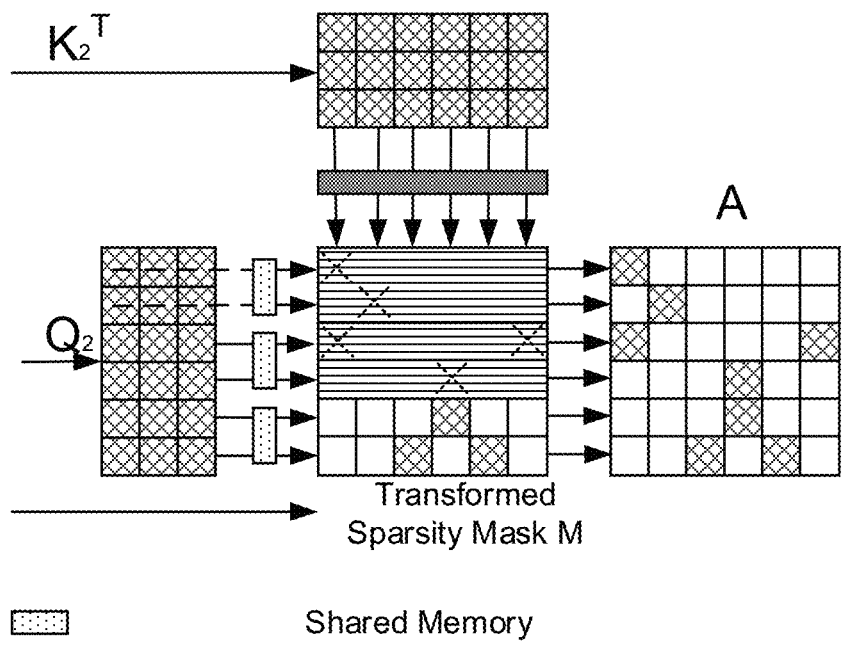
FIG. 7 illustrates an implementation of another SDDMM kernel in accordance with an example of the present disclosure.

FIG. 7 illustrates an implementation of an SDDMM kernel in accordance with an example of the present disclosure. FIG. 7 utilizes the first SDDMM kernel 204 as an example, but not limited to the first SDDMM kernel 204. The 2D local tiling optimization illustrated in FIG. 7 may be implemented by other SDDMM kernels including the first and second SDDMM kernels 204 and 206. As shown in FIG. 7, for illustration purpose, the effective 2D tiles located in the first fourth rows of the transformed sparsity mask M are marked with horizontal straight lines and non-zero element with cross "X". Effective 2D tiles further include an effective tile that is in the fifth and sixth rows of the transformed sparsity mask M.

FIG. 7 illustrates when the input length is medium, elements of the first matrix $Q_2$ corresponding to the effective 2D tiles of the transformed sparsity mask M are loaded into the shared memory while all elements of the transpose of the second matrix $K_2$ are loaded into the L2 cache. The transformed sparsity mask M is divided into three 2D tiles, each of which has a size of 2×6. For example, the first two rows of the first matrix $Q_2$ are corresponding to rows of the first 2D tile which includes two nonzero elements marked with cross "X", i.e., one nonzero element is at the first row and the first column of the transformed sparsity mask M, and the other nonzero element is at the second row and the second column of the transformed sparsity mask M.

In some examples, the input length is very large. For example, the input length is greater than the second length. Due to limited shared memory capacity, e.g., capacity per share memory is smaller than 96 KB in T4 GPU, the tile size has to be set small and all tiles have to be loaded from global memory to shared memory multiple times, which may offset the benefit of 2D local tiling. Thus, when loading the two dense matrices, e.g., Q and $K^T$, the two dense matrices are loaded into registers. In some examples, rows of the first matrix Q corresponding to rows of effective 2D tiles of the transformed sparsity mask M and columns of the transpose of the second matrix corresponding to columns of the effective 2D tiles are loaded into the registers.

Figure 8:
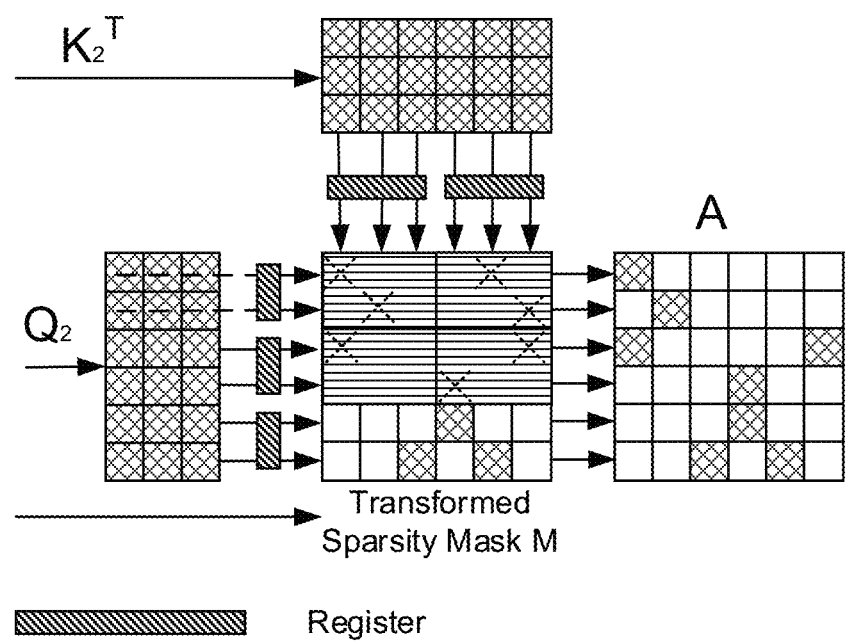
FIG. 8 illustrates an implementation of another SDDMM kernel in accordance with an example of the present disclosure.

FIG. 8 illustrates an implementation of an SDDMM kernel in accordance with an example of the present disclosure. FIG. 8 utilizes the first SDDMM kernel 204 as an example, but not limited to the first SDDMM kernel 204. The 2D local tiling optimization illustrated in FIG. 8 may be implemented by other SDDMM kernels including the first and second SDDMM kernels 204 and 206. As shown in FIG. 8, for illustration purpose, the effective 2D tiles located in the first fourth rows of the transformed sparsity mask M are marked with horizontal straight lines and non-zero element with cross "X". Effective 2D tiles further includes two effective tiles that are in the fifth and sixth rows of the transformed sparsity mask M.

FIG. 8 illustrates when the input length is very large, both rows of the first matrix $Q_2$ corresponding to the effective 2D tiles of the transformed sparsity mask M and columns of the transpose of the second matrix $K_2$ corresponding to the effective 2D tiles are loaded into the registers while the effective 2D tiles also loaded into the shared memory. In some examples, each thread fetches the rows of the first matrix and the columns of the second matrix from a global memory and map each element into its own registers for reuse.

As shown in FIG. 8, the transformed sparsity matrix M are divided into six 2D tiles, each of which has a size of 2×3. For example, the first 2D tile that is on the right top is an effective 2D tile including two non-zero elements marked with cross "X", where one non-zero element $m_{0,0}$ is at the first row and the first column of the transformed sparsity matrix M and the other non-zero element $m_{1,1}$ is at the second row and the second column of the transformed sparsity matrix M. The first two rows of the first matrix $Q_2$ and the first three columns of the transpose of the second matrix $K_2$ are corresponding to the first 2D tile that is effective. Similarly, the effective 2D tile on the right top that includes the non-zero elements $m_{0,4}$ and $m_{1,5}$ is corresponding to the first two rows of the first matrix $Q_2$ and the last three columns of the transpose of the second matrix $K_2$.

Further, the first SDDMM kernel performs the matrix multiplication by fetching the one or more effective first tiles from the shared memory and fetching the plurality of rows of the first matrix and the plurality of columns of the second matrix from the registers. In some examples, each thread performs element-wise multiplication between the plurality of rows of the first matrix and the plurality of columns of the second matrix and then finishes the accumulation through register. Later, accumulated result, i.e., the intermediate data of the first output A, populates in the registers and each thread fetches the value of the one or more effective first tiles of the transformed sparsity mask M into the registers as well and performs a scaling operation to obtain the first output A. Finally, all threads are synchronized, and the first output A is stored to the global memory directly as elements' positions of the first output A that are already known.

The in-depth performance optimization on the sparse matrix multiplication above can achieve significant acceleration of more than 50 times compared to traditional method when applied on GPUs. Such optimization may also extend to other off-the-shelf hardware devices such as AI ASICs, FPGAs, or other chips.

FIG. 9 is a block diagram illustrating an apparatus for length-aware local tiling in a sparse attention in a transformer in heterogeneous devices in accordance with an example of the present disclosure. The system 900 may be a terminal, such as a mobile phone, a tablet computer, a digital broadcast terminal, a tablet device, or a personal digital assistant.

As shown in FIG. 9, the system 900 may include one or more of the following components: a processing component 902, a memory 904, a power supply component 906, a multimedia component 908, an audio component 910, an input/output (I/O) interface 912, a sensor component 914, and a communication component 916.

The processing component 902 usually controls overall operations of the system 900, such as operations relating to display, a telephone call, data communication, a camera operation, and a recording operation. The processing component 902 may include one or more processors 920 for executing instructions to complete all or a part of steps of the above method. The processors 920 may include CPU, GPU, DSP, or other processors. Further, the processing component 902 may include one or more modules to facilitate interaction between the processing component 902 and other components. For example, the processing component 902 may include a multimedia module to facilitate the interaction between the multimedia component 908 and the processing component 902.

The memory 904 is configured to store different types of data to support operations of the system 900. Examples of such data include instructions, contact data, phonebook data, messages, pictures, videos, and so on for any application or method that operates on the system 900. The memory 904 may be implemented by any type of volatile or non-volatile storage devices or a combination thereof, and the memory 904 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or a compact disk.

The power supply component 906 supplies power for different components of the system 900. The power supply component 906 may include a power supply management system, one or more power supplies, and other components associated with generating, managing, and distributing power for the system 900.

The multimedia component 908 includes a screen providing an output interface between the system 900 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 908 may include a front camera and/or a rear camera. When the system 900 is in an operation mode, such as a shooting mode or a video mode, the front camera and/or the rear camera may receive external multimedia data.

The audio component 910 is configured to output and/or input an audio signal. For example, the audio component 910 includes a microphone (MIC). When the system 900 is in an operating mode, such as a call mode, a recording mode and a voice recognition mode, the microphone is configured to receive an external audio signal. The received audio signal may be further stored in the memory 904 or sent via the communication component 916. In some examples, the audio component 910 further includes a speaker for outputting an audio signal.

The I/O interface 912 provides an interface between the processing component 902 and a peripheral interface module. The above peripheral interface module may be a keyboard, a click wheel, a button, or the like. These buttons may include but not limited to, a home button, a volume button, a start button, and a lock button.

The sensor component 914 includes one or more sensors for providing a state assessment in different aspects for the system 900. For example, the sensor component 914 may detect an on/off state of the system 900 and relative locations of components. For example, the components are a display and a keypad of the system 900. The sensor component 914 may also detect a position change of the system 900 or a component of the system 900, presence or absence of a contact of a user on the system 900, an orientation or acceleration/deceleration of the system 900, and a temperature change of system 900. The sensor component 914 may include a proximity sensor configured to detect presence of a nearby object without any physical touch. The sensor component 914 may further include an optical sensor, such as a CMOS or CCD image sensor used in an imaging application. In some examples, the sensor component 914 may further include an acceleration sensor, a gyroscope sensor, a magnetic sensor, a pressure sensor, or a temperature sensor.

The communication component 916 is configured to facilitate wired or wireless communication between the system 900 and other devices. The system 900 may access a wireless network based on a communication standard, such as WiFi, 4G, or a combination thereof. In an example, the communication component 916 receives a broadcast signal or broadcast related information from an external broadcast management system via a broadcast channel. In an example, the communication component 916 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the system 900 may be implemented by one or more of ASICs, Digital Signal Processors (DSPs), Digital Signal Processing Devices (DSPDs), Programmable Logic Devices (PLDs), FPGAs, controllers, microcontrollers, microprocessors, or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 10 is a flowchart illustrating a method for length-aware local tiling in a sparse attention module in a transformer in heterogeneous devices in accordance with an example of the present disclosure.

In step 1002, a heterogeneous device including one or more GPUs divides a transformed sparsity mask into a plurality of first tiles and obtains one or more effective first tiles from the plurality of first tiles, wherein each effective first tile includes at least one non-zero element.

In some examples, the transformed sparsity mask may be the transformed sparsity mask M as shown in FIG. 2.

In step 1004, the heterogeneous device loads the one or more effective first tiles into a shared memory in the one or more GPUs and loads a plurality of elements in a first matrix corresponding to the one or more effective first tiles into the shared memory.

In some examples, the transformed sparsity mask is stored in a compressed format, such as the CRS format.

In some examples, the heterogeneous device may load a plurality of rows of the first matrix corresponding to rows of the one or more effective first tiles into the shared memory.

In step 1006, the heterogeneous device performs the SDDMM by a first SDDMM kernel in a sparse attention module in the transformer by fetching the one or more effective first tiles and the plurality of elements from the shared memory.

In some examples, the heterogeneous device may further determine a length of an input of the transformer, loads a plurality of elements in a second matrix into a local storage of the one or more GPUs, and performs the SDDMM by the first SDDMM kernel in the sparse attention module by fetching the one or more effective first tiles, the plurality of rows of the first matrix from the shared memory and fetching the plurality of elements in the second matrix from the local storage. The local storage may be different than or the same as the shared memory. The local storage may be Graphics Double Data Rate (GDDR) memory.

In some examples, the heterogeneous device may further load a plurality of columns of the second matrix into the shared memory in response to determining that the length of the input of the transformer is less than a first pre-determined length and performs the SDDMM by the first SDDMM kernel in the sparse attention module by fetching the one or more effective first tiles, the plurality of rows of the first matrix, and the plurality of columns of the second matrix from the shared memory, as shown in FIG. 6.

In some examples, the heterogeneous device may further load both the first and the second matrices into registers in the one or more GPUs in response to determining that the length of the input of the transformer is greater than a second pre-determined length and performs the SDDMM by the first SDDMM kernel in the sparse attention module by fetching the one or more effective first tiles from the shared memory and fetching the plurality of rows of the first matrix and the plurality of columns of the second matrix from the registers, as shown in FIG. 8.

In some examples, the heterogeneous device may further load the second matrix into a L2 cache in the one or more GPUs in response to determining that the length of the input of the transformer is no less than a first pre-determined length and no greater than a second pre-determined length. The shared memory has higher processing speed and lesser storage capacity than the L2 cache, as shown in FIG. 7.

Furthermore, the heterogeneous device may perform the SDDMM by the first SDDMM kernel in the sparse attention module by fetching the one or more effective first tiles and the plurality of rows of the first matrix from the shared memory and fetching the second matrix from the L2 cache.

In some examples, the heterogeneous device may further transform a sparsity mask in a regular dense matrix format into the transformed sparsity mask in the compressed format. The sparsity mask may indicate a sparsity attention pattern.

In some examples, the heterogeneous device may further generate a first output by the first SDDMM kernel based on the one or more effective first tiles and the plurality of elements fetched from the shared memory, load the first output into a softmax kernel in the sparse attention module and generate a second output by performing a softmax function on the first output, divide the transformed sparsity mask into a plurality of second tiles and obtain one or more effective second tiles from the plurality of second tiles, load the one or more effective second tiles into the shared memory in the one or more GPUs, load a plurality of columns of a third matrix corresponding to columns of the one or more effective second tiles into the shared memory, load a plurality of rows of the second output corresponding to rows of the one or more effective second tiles into the shared memory, and perform multiplication by a second SDDMM kernel in the sparse attention module by fetching the one or more effective second tiles, the plurality of columns of the third matrix, and the plurality of rows of the second output from the shared memory. Each effective second tile may include at least one non-zero element, the second output may be in the regular dense matrix format, and the first output may be a sparse matrix.

In some examples, the heterogenous device may further obtain the first matrix, the second matrix, and the third matrix by respectively linearly projecting intermediate representations of an input of the transformer. The first matrix, the second matrix, and the third matrix may be in regular dense matrix format.

In some examples, each thread may perform element-wise multiplication between the row of the first matrix and the column of the second matrix, and intermediate data of the first output may be accumulated by the registers and populated in the registers. Further, each thread may fetch the one or more effective first tiles into the registers and obtain the first output based on the intermediate data and the one or more effective first tiles. Moreover, all threads are synchronized and the first output is stored to a global memory of the one or more GPUs directly as elements' positions of the first output.

In some embodiments, there is provided a non-transitory computer readable storage medium 904, having instructions stored therein. When the instructions are executed by one or more processors 920, the instructions cause the processor to perform methods as described in FIG. 10 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for length-aware local tiling in a sparse attention module in a transformer in heterogeneous devices, comprising:
  dividing, by a heterogeneous device comprising one or more graphic processing units (GPUs), a transformed sparsity mask into a plurality of first tiles and obtaining one or more effective first tiles from the plurality of first tiles, wherein each effective first tile comprises at least one non-zero element;
  loading, by the heterogeneous device, the one or more effective first tiles into a shared memory in the one or more GPUs and loading a plurality of elements in a first matrix corresponding to the one or more effective first tiles into the shared memory; and
  performing, by the heterogeneous device, multiplication by a first sampled dense-dense matrix multiplication (SDDMM) kernel in the sparse attention module in the transformer by fetching the one or more effective first tiles and the plurality of elements from the shared memory.

2. The method of claim 1, wherein the transformed sparsity mask is stored in a compressed format, and
  wherein loading the plurality of elements in the first matrix corresponding to the one or more effective first tiles into the shared memory comprises:
  loading a plurality of rows of the first matrix corresponding to rows of the one or more effective first tiles into the shared memory.

3. The method of claim 2, further comprising:
  determining, by the heterogeneous device, a length of an input of the transformer;
  loading, the heterogeneous device, a plurality of elements in a second matrix into a local storage of the one or more GPUs, wherein the local storage is different than or the same as the shared memory; and
  performing the multiplication by the first SDDMM kernel in the sparse attention module by fetching the one or more effective first tiles, the plurality of rows of the first matrix from the shared memory and fetching the plurality of elements in the second matrix from the local storage.

4. The method of claim 3, further comprising:
in response to determining that the length of the input of the transformer is less than a first pre-determined length, loading, by the heterogeneous device, a plurality of columns of the second matrix into the shared memory; and
performing the multiplication by the first SDDMM kernel in the sparse attention module by fetching the one or more effective first tiles, the plurality of rows of the first matrix, and the plurality of columns of the second matrix from the shared memory.

5. The method of claim 3, further comprising:
in response to determining that the length of the input of the transformer is greater than a second pre-determined length,
loading, by the heterogeneous device, both the first and second matrices into registers in the one or more GPUs; and
performing the multiplication by the first SDDMM kernel in the sparse attention module by fetching the one or more effective first tiles from the shared memory and fetching the plurality of rows of the first matrix and the plurality of columns of the second matrix from the registers.

6. The method of claim 5, wherein loading both the first and second matrices into the registers in the one or more GPUs comprises:
fetching, by each thread, the plurality of rows of the first matrix and the plurality of columns of the second matrix from a global memory of the one or more GPUs and mapping each element into the registers for reuse.

7. The method of claim 3, further comprising:
in response to determining that the length of the input of the transformer is no less than a first pre-determined length and no greater than a second pre-determined length, loading, by the heterogeneous device, the second matrix into a L2 cache in the one or more GPUs, wherein the shared memory has higher processing speed and lesser storage capacity than the L2 cache; and
performing the multiplication by the first SDDMM kernel in the sparse attention module by fetching the one or more effective first tiles and the plurality of rows of the first matrix from the shared memory and fetching the second matrix from the L2 cache.

8. The method of claim 2, further comprises:
transforming, by the heterogeneous device, a sparsity mask in a regular dense matrix format into the transformed sparsity mask in the compressed format, wherein the sparsity mask indicates a sparsity attention pattern.

9. The method of claim 2, further comprising:
generating, by the heterogeneous device, a first output by the first SDDMM kernel based on the one or more effective first tiles and the plurality of elements fetched from the shared memory;
loading, by the heterogeneous device, the first output into a softmax kernel in the sparse attention module and generating, by the heterogeneous device, a second output by performing a softmax function on the first output, wherein the first output is a sparse matrix;
dividing, by the heterogeneous device, the transformed sparsity mask into a plurality of second tiles and obtaining, by the heterogeneous device, one or more effective second tiles from the plurality of second tiles, wherein each effective second tile comprises at least one non-zero element, wherein the second output is in a regular dense matrix format;
loading, by the heterogeneous device, the one or more effective second tiles into the shared memory in the one or more GPUs;
loading, by the heterogeneous device, a plurality of columns of a third matrix corresponding to columns of the one or more effective second tiles into the shared memory;
loading, by the heterogeneous device, a plurality of rows of the second output corresponding to rows of the one or more effective second tiles into the shared memory; and
performing, by the heterogeneous device, multiplication by a second SDDMM kernel in the sparse attention module by fetching the one or more effective second tiles, the plurality of columns of the third matrix, and the plurality of rows of the second output from the shared memory.

10. The method of claim 9, wherein the first matrix, the second matrix, and the third matrix are in the regular dense matrix format.

11. The method of claim 5, wherein performing the multiplication by the first SDDMM kernel in the sparse attention module by fetching the one or more effective first tiles from the shared memory and fetching the plurality of rows of the first matrix and the plurality of columns of the second matrix from the registers comprises:
performing, by each thread, element-wise multiplication between the plurality of rows of the first matrix and the plurality of columns of the second matrix;
accumulating intermediate data of the first output by the registers and populating the intermediate data in the registers;
fetching, by each thread, the one or more effective first tiles into the registers and obtaining the first output based on the intermediate data and the one or more effective first tiles; and
synchronizing all threads and storing the first output to a global memory of the one or more GPUs directly as elements' positions of the first output.

12. An apparatus for length-aware local tiling in a sparse attention module in a transformer in heterogeneous devices, comprising:
one or more processors; and
a memory configured to store instructions executable by the one or more processors,
wherein the one or more processors, upon execution of the instructions, are configured to:
divide a transformed sparsity mask into a plurality of first tiles and obtain one or more effective first tiles from the plurality of first tiles, wherein each effective first tile comprises at least one non-zero element;
load the one or more effective first tiles into a shared memory in the one or more processors and load a plurality of elements in a first matrix corresponding to the one or more effective first tiles into the shared memory; and
perform multiplication by a first sampled dense-dense matrix multiplication (SDDMM) kernel in the sparse attention module in the transformer by fetching the one or more effective first tiles and the plurality of elements from the shared memory.

13. The apparatus of claim 12, wherein the transformed sparsity mask is stored in a compressed format, and
wherein the one or more processors are further configured to:
load a plurality of rows of the first matrix corresponding to rows of the one or more effective first tiles into the shared memory.

14. The apparatus of claim 13, wherein the one or more processors are further configured to:
determine a length of an input of the transformer;
load a plurality of elements in a second matrix into a local storage of the one or more GPUs, wherein the storage is different than or the same as the shared memory; and
perform the multiplication by the first SDDMM kernel in the sparse attention module by fetching the one or more effective first tiles, the plurality of rows of the first matrix from the shared memory and fetching the plurality of elements in the second matrix from the local storage.

15. The apparatus of claim 14, wherein the one or more processors are further configured to:
in response to determining that the length of the input of the transformer is less than a first pre-determined length, load a plurality of columns of the second matrix into the shared memory; and
perform the multiplication by the first SDDMM kernel in the sparse attention module by fetching the one or more effective first tiles, the plurality of rows of the first matrix, and the plurality of columns of the second matrix from the shared memory.

16. The apparatus of claim 14, wherein the one or more processors are further configured to:
in response to determining that the length of the input of the transformer is greater than a second pre-determined length, load both the first and second matrices into registers in the one or more GPUs; and
perform the multiplication by the first SDDMM kernel in the sparse attention module by fetching the one or more effective first tiles from the shared memory and fetching the plurality of rows of the first matrix and the plurality of columns of the second matrix from the registers.

17. The apparatus of claim 16, wherein the one or more processors are further configured to:
fetch, by each thread, the plurality of rows of the first matrix and the plurality of columns of the second matrix from a global memory of the one or more GPUs and map each element into the registers for reuse.

18. The apparatus of claim 14, wherein the one or more processors are further configured to:
in response to determining that the length of the input of the transformer is no less than a first pre-determined length and no greater than a second pre-determined length, load a second matrix into a L2 cache in the one or more GPUs, wherein the shared memory has higher processing speed and lesser storage capacity than the L2 cache; and
perform the multiplication by the first SDDMM kernel in the sparse attention module by fetching the one or more effective first tiles and the plurality of rows of the first matrix from the shared memory and fetching the second matrix from the L2 cache.

19. The apparatus of claim 13, wherein the one or more processors are further configured to:
transform a sparsity mask in a regular dense matrix format into the transformed sparsity mask in the compressed format, wherein the sparsity mask indicates a sparsity attention pattern.

20. The apparatus of claim 13, wherein the one or more processors are further configured to:
generate a first output by the first SDDMM kernel based on the one or more effective first tiles and the plurality of elements fetched from the shared memory;
load the first output into a softmax kernel in the sparse attention module and generate a second output by performing a softmax function on first output, wherein the first output is a sparse matrix;
divide the transformed sparsity mask into a plurality of second tiles and obtain one or more effective second tiles from the plurality of second tiles, wherein each effective second tile comprises at least one non-zero element, wherein the second output is in a regular dense matrix format;
load the one or more effective second tiles into the shared memory in the one or more GPUs;
load a plurality of columns of a third matrix corresponding to columns of the one or more effective second tiles into the shared memory;
load a plurality of rows of the second output corresponding to rows of the one or more effective second tiles into the shared memory; and
perform multiplication by a second SDDMM kernel in the sparse attention module by fetching the one or more effective second tiles, the plurality of columns of the third matrix, and the plurality of rows of the second output from the shared memory.

21. The apparatus of claim 20, wherein the first matrix, the second matrix, and the third matrix are in a regular dense matrix format.

22. The apparatus of claim 20, wherein the one or more processors are further configured to:
perform, by each thread, element-wise multiplication between the plurality of rows of the first matrix and the plurality of columns of the second matrix;
accumulate intermediate data of the first output by the registers and populate the intermediate data in the registers;
fetch, by each thread, the one or more effective first tiles into the registers and obtain the first output based on the intermediate data and the one or more effective first tiles; and
synchronize all threads and store the first output to a global memory of the one or more GPUs directly as elements' positions of the first output.

23. A non-transitory computer readable storage medium, comprising instructions stored therein, wherein, upon execution of the instructions by one or more processors, the instructions cause the one or more processors to perform acts comprising:
dividing a transformed sparsity mask into a plurality of first tiles and obtaining one or more effective first tiles from the plurality of first tiles, wherein each effective first tile comprises at least one non-zero element;
loading the one or more effective first tiles into a shared memory in the one or more processors and loading a plurality of elements in a first matrix corresponding to the one or more effective first tiles into the shared memory; and
performing multiplication by a first sampled dense-dense matrix multiplication (SDDMM) kernel in a sparse attention module in a transformer in heterogeneous devices by fetching the one or more effective first tiles and the plurality of elements from the shared memory.

* * * * *